(12) United States Patent
Errera

(10) Patent No.: US 7,252,491 B2
(45) Date of Patent: Aug. 7, 2007

(54) FOOD IMPRESSING ROLLER DEVICE

(76) Inventor: Richard Ben Errera, 39 Richmond Blvd., Unite 1A, Ronkonkoma, NY (US) 11779

( * ) Notice: Subject to any disclaimer, the term of this patent is extended or adjusted under 35 U.S.C. 154(b) by 106 days.

(21) Appl. No.: 10/423,562

(22) Filed: Apr. 25, 2003

(65) Prior Publication Data

US 2004/0040444 A1 Mar. 4, 2004

Related U.S. Application Data

(60) Provisional application No. 60/406,443, filed on Aug. 28, 2002.

(51) Int. Cl.
*A21C 11/08* (2006.01)

(52) U.S. Cl. .................. 425/96; 425/194; 425/363; 425/404; 7/111

(58) Field of Classification Search .............. 425/90, 425/96, 194, 290, 363, 385, 404; 7/111, 7/113; 30/306; D7/362, 365, 676
See application file for complete search history.

(56) References Cited

U.S. PATENT DOCUMENTS

| | | | | |
|---|---|---|---|---|
| 126,833 A | * | 5/1872 | Rippon | 7/111 |
| 177,319 A | * | 5/1876 | Blaul | 425/471 |
| 522,465 A | * | 7/1894 | Goodnough | 7/111 |
| 1,162,425 A | * | 11/1915 | Wilcox | 156/421 |
| 2,075,157 A | * | 3/1937 | Alberti | 7/111 |
| 2,099,286 A | * | 11/1937 | Usbeck | 30/306 |
| 3,536,014 A | | 10/1970 | Kuchuris et al. | 107/8 |
| 3,936,255 A | | 2/1976 | Bellacicco | 425/101 |
| 4,426,200 A | * | 1/1984 | Muller | 425/101 |
| 5,642,659 A | | 7/1997 | Sesona et al. | 99/376 |
| 5,834,047 A | | 11/1998 | Ahn | 426/383 |
| 5,996,476 A | | 12/1999 | Schultz | 99/349 |
| 6,406,733 B1 | | 6/2002 | Willcocks et al. | 426/515 |
| 6,431,849 B1 | | 8/2002 | Capodieci | 425/147.2 |

OTHER PUBLICATIONS

Tips, Ticks, & Techniques, "Stamp Assembly", 6 pages.
PCT/US05/06042 May 25, 2005 PCT-International Search Report and Written Opinion of Applicant's PCT Application.
Stampin Around, advertisement, one page, date unknown.

* cited by examiner

*Primary Examiner*—Yogendra N. Gupta
*Assistant Examiner*—Dimple Bodawala
(74) *Attorney, Agent, or Firm*—Alfred M. Walker; Lee Grosskrenz Hechtel

(57) ABSTRACT

An impression device for food items, which is a rolling device designed to create images upon a variety of foods for decoration and/or marketing purposes. As the device is hand-rolled along the food, the decorative letters and images create a repeated pattern of impressions upon the food. The roller device is particularly suitable for impressing narrow foods such as pizza crusts, certain pasta noodles, lattice pie tops, breadsticks, or the edges of melons. The device provides a firm, comfortable grip for all hand sizes that can be used with one or two hands.

17 Claims, 11 Drawing Sheets

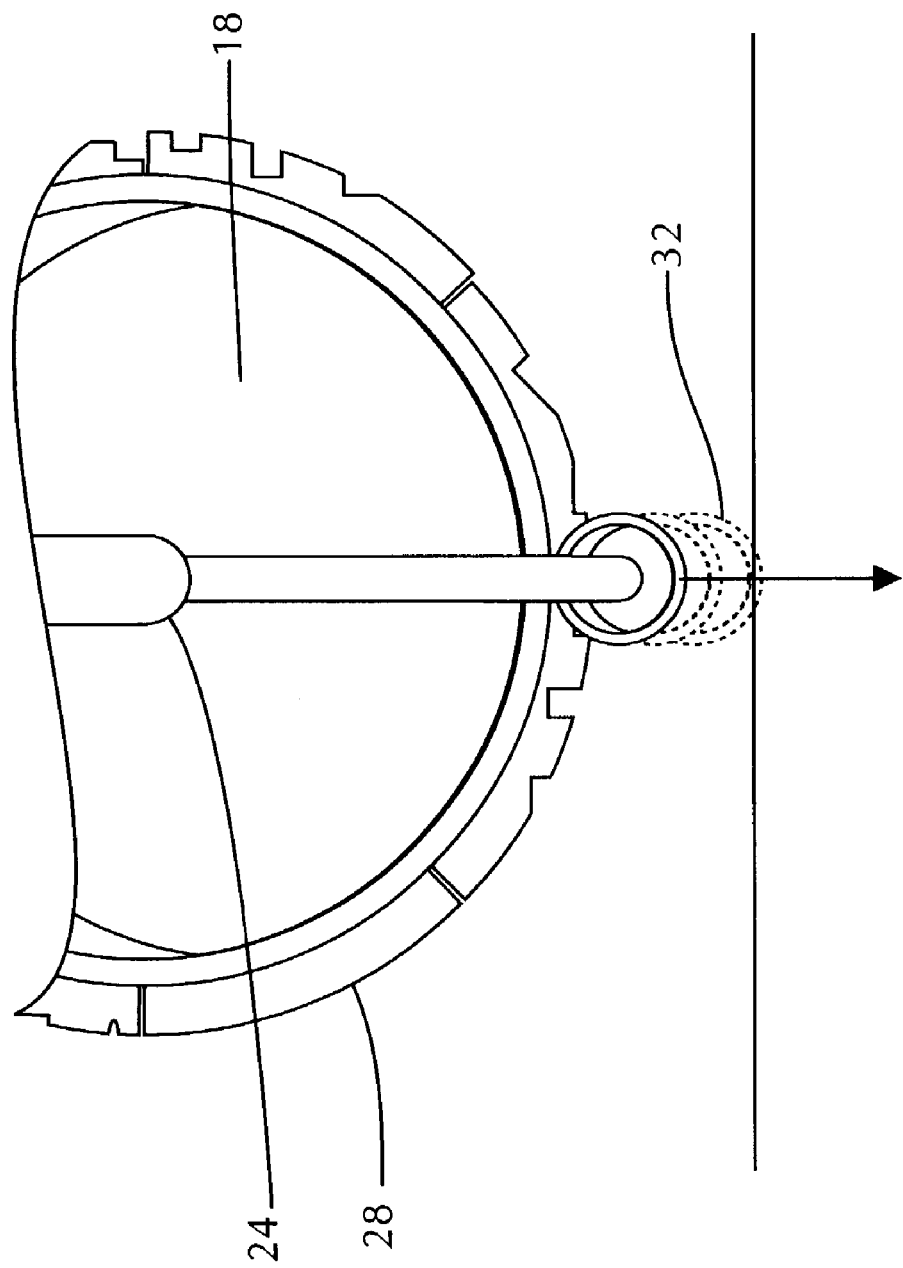

FOOD IMPRESSING ROLLER DEVICE

BACKGROUND OF THE INVENTION

This application relates to material disclosed in Provisional Patent Application No. 60/406,443, filed on Aug. 28, 2002 by the present Applicant.

FIELD OF THE INVENTION

The present invention is an impression device for food items. More particularly, the present invention is a roller device designed to create images upon a variety of foods for decoration and/or marketing purposes.

DESCRIPTION OF THE PRIOR ART

Numerous innovations for decorative food devices have been provided in the prior art that are described as follows. Even though these innovations may be suitable for the specific individual purposes to which they address, they differ from the present invention as hereinafter contrasted. The following is a summary of those prior art patents most relevant to the invention at hand, as well a description outlining the differences between the features of the present invention and those of the prior art.

1. U.S. Pat. No. 5,996,476, invented by Schultz, Entitled "Device for Pressing, Imprinting and Cooking Flat Bread Products"

The patent to Schultz describes an imprinting press and cooking apparatus for a dough product which includes an imprinting station with respective opposed lower press and upper imprinting plates and rotating plate or endless belt conveyors adjacent the imprinting station for moving the dough product which has been pressed and imprinted through a cooking or baking phase. Heat sources are disposed adjacent the imprinting station and the conveyors for preheating the dough product for release from the printing station and for cooking the dough product, respectively. A pressure air slide is disposed between conveyor stages for transferring the dough product from one conveyor stage to another. Pressure air is supplied to the air slide through a conduit and into a chamber for flow through a perforated plate which supports the dough product for movement along the slide.

2. U.S. Pat. No. 6,242,026, invented by Feeley, Entitled "Illustration Applicator For Food Products"

The patent to Feeley describes a method of creating food product, such as pizza, which will produce an illustrated, decorative personalized food product by using edible symbols and or edible granules and or edible powder. The edible symbols, granules or powder, which may have coloring, are applied to the surface of food product by using a symbol placement applicator that applies precut symbols and or a stencil placement applicator, which applies granulated or powdered edibles to form designs. The symbols and or granulated or powder design is fused to the food product during a thermal fusing process.

3. U.S. Pat. No. 4,578,273, invented by Krubert, Entitled "Printing Of Foods"

The patent to Krubert describes a method of forming a printed food or baked product, and the product itself comprises forming a hard, non-porous icing surface by drying an icing mixture and printing one or more edible inks on the hard surface of the icing using a printing pad having an edible silicone oil therein. The icing may be in the form of a coating on a hard baked product. The specific gravity of the icing mixture before drying is between about 1.0 and 2.5 and, preferably, between about 1.05 and 1.5. The hard baked product has a finished moisture of between about 2-10% by weight of the finished baked product and, preferably, between about 2-8% by weight.

4. U.S. Pat. No. 5,789,009, invented by Kordic et al., Entitled "Pizza Pie With Crust Structure"

The patent to Kordic et al. describes a pizza mold and method for making a pizza which includes a frame having a generally planar surface with one or more cavities extending across an extent of the frame. One cavity can be disposed at a location on the frame which corresponds to a desired configuration for the pizza. One or more cavities can in addition or alternatively extend across the frame in a desired geometric or fanciful configuration, such as an alpha-numeric character, cartoon character, etc. The dough is brought into contact with the frame either by forming the dough across the surface of the frame such that the dough covers the frame and is pressed into the cavities, or the dough can be located only within the cavities. In the former case, the frame is removed with the cavities imparting raised ridges of dough on the crust, while in the latter case the flat pizza pie can be formed separately and the frame inverted such that the dough in the frame is transferred onto the surface of the pie to impart the raised ridges of dough on the pie. Toppings can be located between (or within) the ridges on the dough, and the dough is baked such that the ridges form crust on the pizza.

5. U.S. Pat. No. 4,285,978, invented by Quinlivan, Entitled "Method For Decorating Baked Goods And The Like"

The Quinlivan invention describes a method whereby decorative designs and the like can be formed upon baked goods by transferring a pre-printed design from a transfer material to an uncooked dough surface. In one embodiment the dough surface is first covered with a thin layer of flour preparatory to transferring a water-soluble ink design to the dough. In a preferred embodiment after the dough is baked a liquid glaze is applied to the surface thereof for imparting a decorative and protective coating to the baked goods. The process of the invention is suitable for both hand and automated operation.

6. U.S. Pat. No. 5,017,394, invented by Macpherson et al., Entitled "Method For Making Edible Base Shapes Having Pictorial Images For Decorating Foodstuffs"

The patent to Macpherson et al. describes a method of using a silk screen to form thin, flat, flexible, free standing base shapes or transfers directly on release paper in their final form from fluid base shape material, all in one step. After drying, pictorial images are then silk screened onto the base shapes to produce the final edible image for decorating foodstuffs. Recipes for preparing the fluid base shape material and a novel machine for peeling the base shapes from the release paper with a spring steel blade are also disclosed.

7. U.S. Pat. No. 5,834,047, invented by Ahn, entitled "Method For Imprinting Confectionery Products With Edible Ink"

The Ahn invention relates to a method of imprinting diverse shapes of multiple colors inside the confectionery products with edible ink. According to the present invention, a liquified mixture of confectionery material is partially filled and solidified in a plurality of molds. A plurality of etching plates, which have been partially perforated along the predetermined shape and according to the number of predetermined colors, are mounted on the surface of the solidified mixture. Edible ink of predetermined colors is dispersed by turns on the plurality of said etched plates, and the remaining portion of the liquified mixture is filled and solidified in the plurality of molds.

8. U.S. Pat. No. 4,656,927, invented by Mosby et al., Entitled "Device For Making Designs On Toast"

The patent to Mosby et al. describes a device for producing designs on a slice of bread during toasting of the bread which comprises a bread holding member removably received within the toast well of an electric toaster. The bread holding member is of lightweight heat resistive material having a bottom portion resting on the bread carriage member of the toaster and side panels which receive and carry a slice of bread to be toasted. Either or both of the side panels has a template cut out defining a framed central opening with a design therein. The design shields the bread slice from the heat of the toaster such that the design will be reproduced on the bread slice in toasting. An insulated handle provides for inserting and removing the bread holder from the toast well and to protect the user from accidental burns or electrical shock. The bread holding member is isolated from direct contact with electrical conduit and heating elements of the toaster. A modification of the device includes removable side panels.

9. U.S. Pat. No. 5,992,305, invented by Naivar, Entitled "Diamond Shaped Charmarker"

The patent to Naivar describes a charmarker for creating complex grid pattern of mark, such as a diamond-shaped grid pattern, on foods as the foods pass under the charmarker on a conveyor. The charmarker contains a rotating shaft on which heated char marking rings rotatably hang. Each of the rings is provided with parallel, spaced apart cross marking members located at the periphery of the ring. The shaft is provided with ridges and valleys that engage, in a gear fashion, teeth and grooves provided on an interior opening surface of each ring in order to keep the rings in synchronized rotation as they pass over the food. Synchronized rotation of the rings keeps the cross marking members on the rings aligned so that the desired grid pattern of mark appears on the food.

10. U.S. Pat. No. 4,290,349, invented by Fiorenza, Entitled "Toaster Accessory"

In the patent to Fiorenza, a toaster accessory is provided in the form of a pair of hinged foraminous panels forming a holder adapted to hold one or several slices of bread therebetween. In its preferred use, a sandwich is placed between the two panels and the holder, when closed, is dimensioned to fit into a conventional toaster so that a pre-made sandwich may be conveniently toasted therein. The hinge connection between the two panels is self-adjusting and a locking device at the opposite end is able to lock at different thicknesses. Decorative inserts may be added to the panels for making designs on the surface of the toasted bread.

The relevant prior art described above largely entails: imprinting and cooking devices for dough products that include press and imprinting plates; edible symbols and/or granulated or powder designs fused to food by thermal fusing processes; printing edible inks on the hard surface of icing of hard baked products; and various pre-printed designs applied to uncooked dough surfaces.

In contrast, the roller device of the present invention creates images upon foods via actual embossing or stamping, for decoration and/or marketing purposes. As such the device may be utilized for: 1) standard messages and images; 2) snap-in letters, which allows the user to assemble his or her own custom message; or 3) custom logos, messages, and images.

The roller device includes a wheel with raised letters and images to create a repeated pattern of impressions upon the food when hand-rolled thereon. The roller device is particularly suitable for embossing narrow foods such as pizza crusts, certain pasta noodles, lattice pie tops, breadsticks, or the edges of melons. The roller features an adjustable embossing depth, as well as customizable images. The device further functions to cut strips of foods while embossing, and may comprise an interchangeable food-coloring cartridge for optional, simultaneous coloring of the messages and/or images created.

SUMMARY OF THE INVENTION

As noted, the present invention is an impression device for food items. More particularly, the present invention is a rolling device designed to create images upon a variety of foods for decoration and/or marketing purposes.

The roller device comprises a generally seashell-shaped housing, which encases a wheel with raised letters and images. In the preferred mode, the wheel is six inches in diameter, though other sizes may be utilized. As the wheel is hand-rolled along the food in question, the raised letters and images create a repeated pattern of impressions upon the food. The roller device is particularly suitable for impressing narrow foods such as pizza crusts, certain pasta noodles, lattice pie tops, breadsticks, or the edges of melons. The device provides a firm, comfortable grip for all hand sizes that can be used with one or two hands.

Regarding its versatility, the impressing wheel may be utilized for: 1) standard messages and images; 2) snap-in letters, which allows the user to assemble his or her own custom message; or 3) custom logos, messages, and images. The roller device also features an adjustable impressing depth, as well as customizable images.

In addition, the device further functions to quickly cut strips of foods while impressing, if desired. Moreover, the device may comprise an interchangeable food-coloring cartridge for optional, simultaneous coloring of the messages and/or images created. Such modular components are easy to assemble and disassemble, such as for cleaning purposes.

In light of the foregoing, it is generally an object of the present invention to provide a device that impresses images and/or letters onto a variety of foods.

It is also an object of the invention to provide a versatile device that may be used in a great variety of commercial, industrial, or residential applications.

It is a further object of the invention to provide an item that may be constructed of a variety of relatively inexpensive materials suitable to accomplish the aforementioned purposes.

It is an additional object of the invention to provide an item that may be produced in a variety of sizes, according to need.

It is also an object of the invention to provide a device that allows the user to customize impressing patterns through usage of a convenient snap-in feature.

It is another aim of the invention to provide a device that allows for impressing of standard phrases and images or custom phrases and images.

It is another object of the invention to provide a device that may be used to cut food while impressing.

It is also an object of the invention to provide a device which may comprise wavy edges to impress an interesting and aesthetically-pleasing edge on a variety of foods.

It is a further object of the invention to provide a device that utilizes a minimal number of parts.

It is also an object of the invention to provide a device that may be assembled and disassembled by the user easily.

It is a further object of the invention to provide a device that may be easily set down on a flat surface in a vertical position.

It is also an object of the invention to provide a device that may be easily cleaned in commercial or residential dishwashers.

It is another object of the invention to provide a device that may be injection molded, cast, molded, or machined by the manufacturer.

It is another aim of the invention to provide a device that can withstand considerable heat, and is constructed to be highly durable in nature.

It is also an object of the invention to provide a device that allows the user to adjust the depth of impressing for foods that have differing impressing needs and thickness.

Finally, it is an object of the invention to provide a device that allows the user to apply color to the impressing on or in the food for decorating and/or advertising purposes.

The novel features which are considered characteristic for the invention are set forth in the claims. The invention itself, both as to its construction and its method of operation, together with additional objects and advantages thereof, will be best understood from the following description of the embodiments when read and understood in connection with accompanying drawings.

BRIEF DESCRIPTION OF PREFERRED EMBODIMENTS

FIG. 11 is a side perspective view of the present invention, illustrating the principal components thereof, and illustrating the depth control means in operation.

DETAILED DESCRIPTION OF THE PREFERRED EMBODIMENT

The present invention is a roller device that impresses images and/or letters into a variety of foods. Although the device is primarily intended for use in commercial and catering locations, usage is not limited to such applications. The device may also be effectively used in residential settings as well as a variety of additional contexts.

Figure 1:
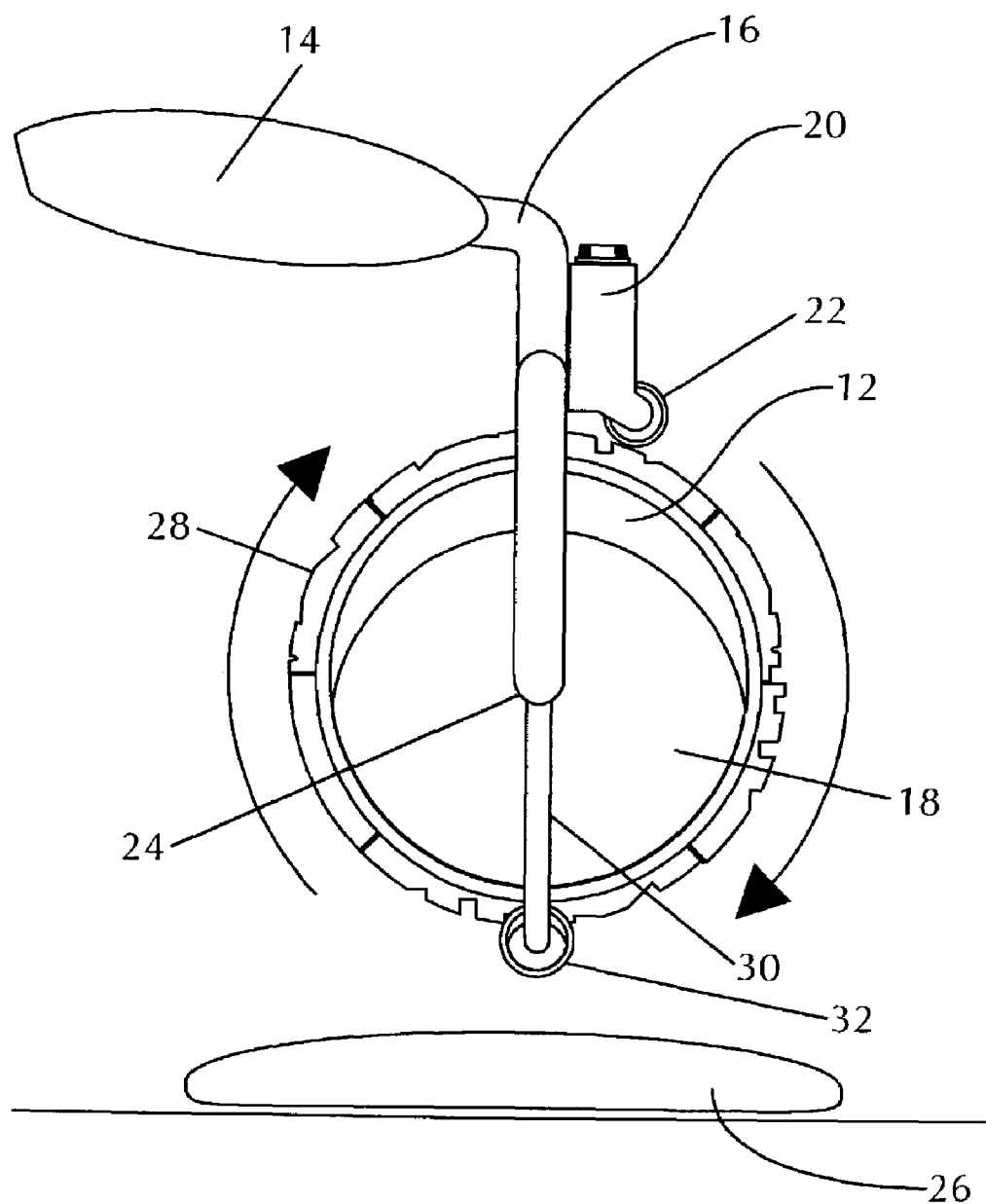
FIG. 1 is a side perspective view of the present invention, illustrating the principal components thereof, with the device about to be applied to the food in question.
Figure 2:
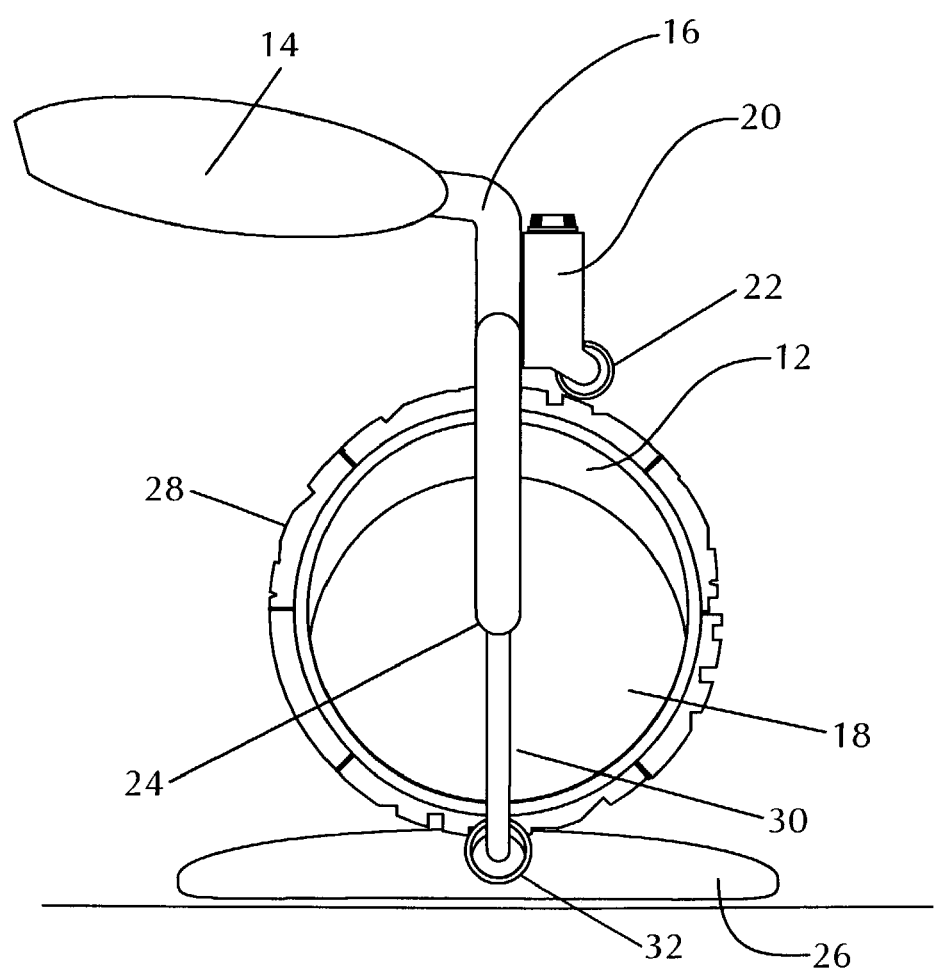
FIG. 2 is a side perspective view of the present invention, illustrating the principal components thereof, with the device in use upon the food in question.
Figure 3:
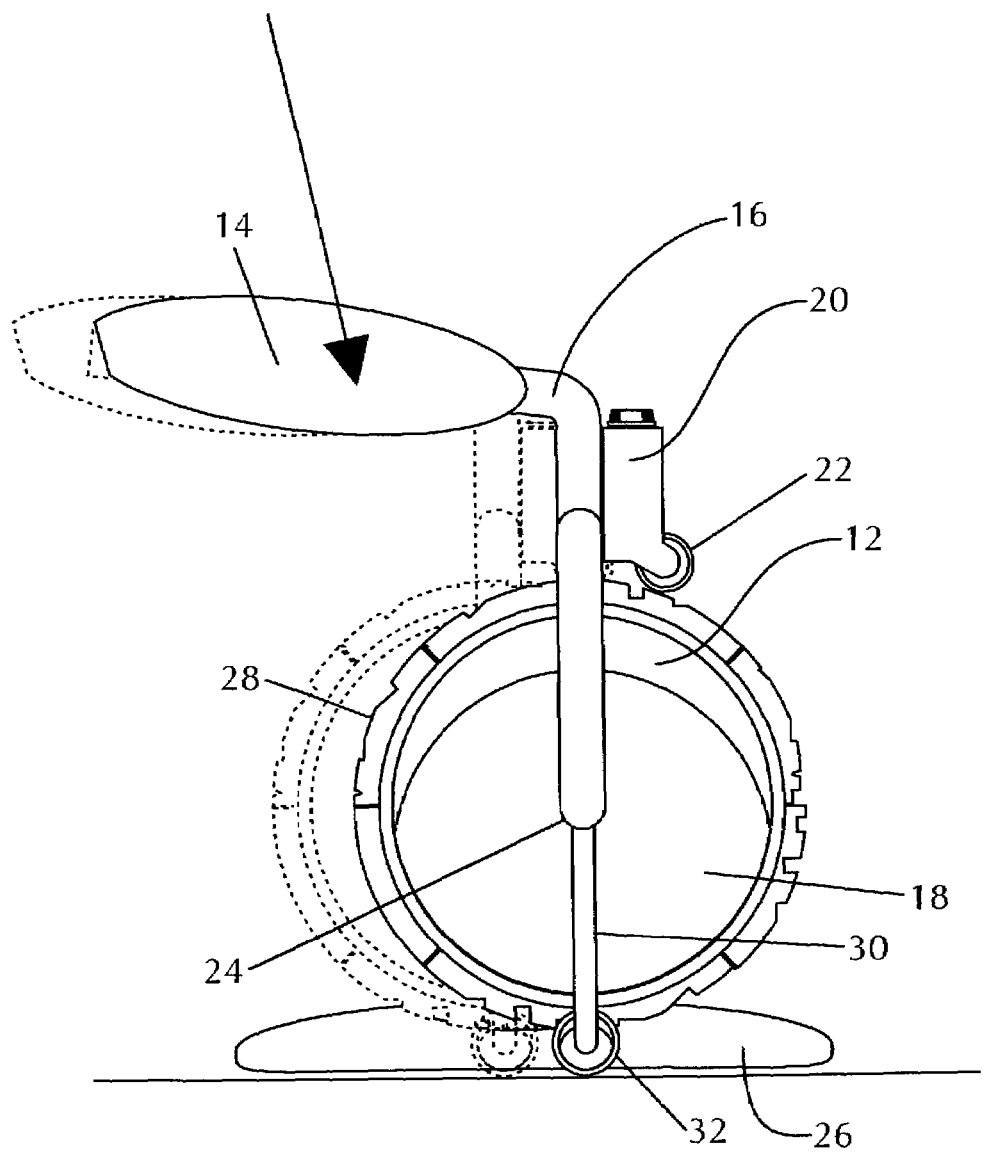
FIG. 3 is a side perspective view of the present invention, illustrating the principal components thereof, with the device in use upon the food in question, and illustrating the intended path of movement of same.

Specifically, as shown in FIGS. 1, 2, and 3, in the preferred mode of production, the roller device consists of two main assemblies. The first assembly is a cover/handle member (12), which resembles a fender. The cover/handle member (12) comprises universal hand placement locations (14), for the purposes of versatility and comfort, as it allows the user to grasp the product in any comfortable position.

The cover/handle (12) further comprises an attachment for an impressing wheel (18), as well as an attachment for a coloring device (20).

A universal hand placement location (14) follows the outer surface of the cover/handle (12). Importantly, such provides an easy transition from one hand to another, which is particularly helpful when the user is following an outer circumference of a round food item (26), such as a pizza.

The wheel (18) consists of a cylinder inverted sideways, allowing same to roll effectively. Such provides a center-rotating axis at a middle portion thereof (24). The cover/handle member (12) drapes over the embossing wheel (18) attaching to same at the center-rotating axis of the wheel (24), as best depicted in FIG. 5.

The coloring device (20) attaches to the cover/handle (12) on either edge (16) that is parallel to the rotating axis of the impressing wheel (18). The device has a wheel (22) which comes into contact with impressing wheel (18) transferring a coloring substance thereto. The wheel (18) in turn transfers it to the material being impressed (26).

Figure 6:
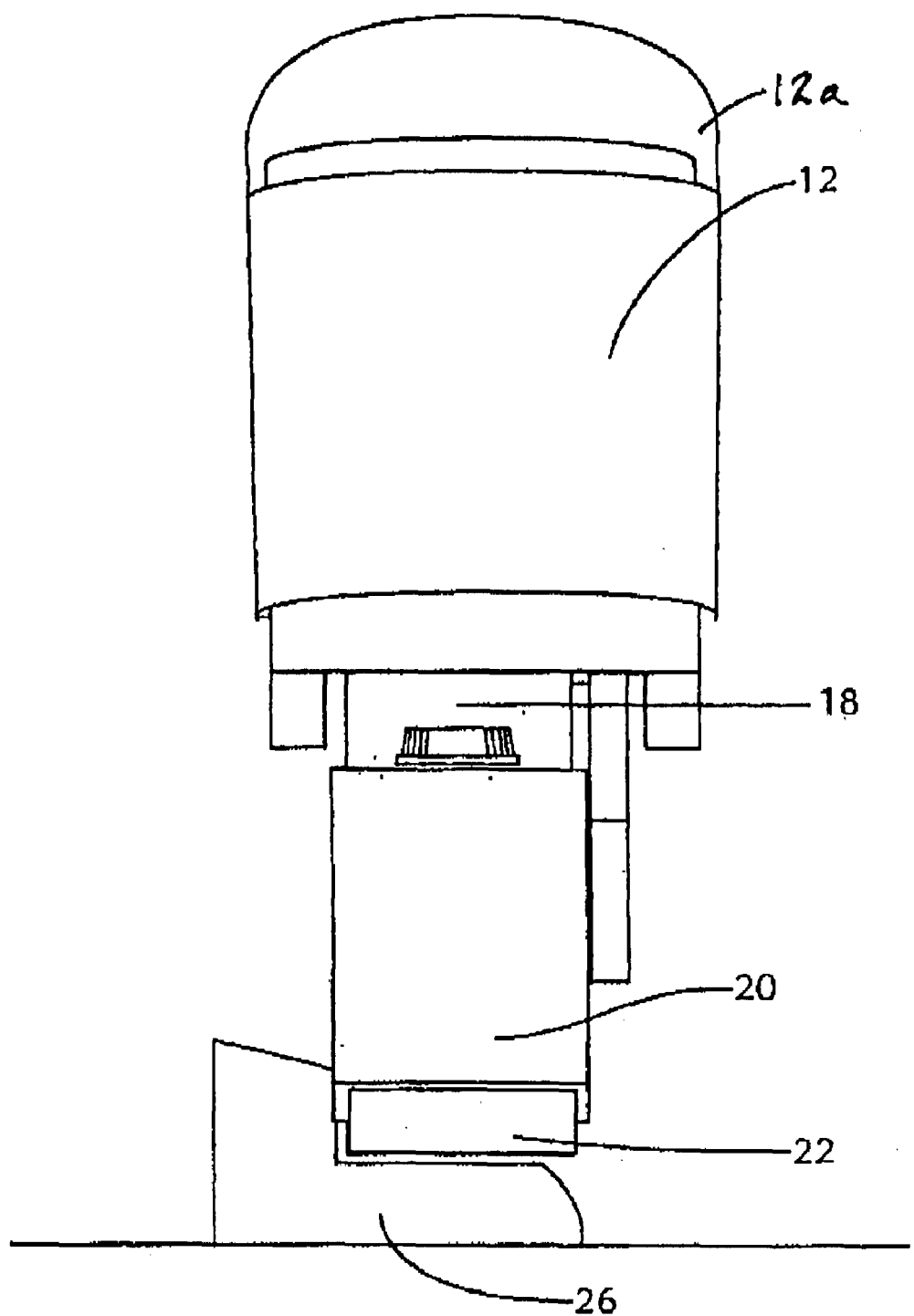
FIG. 6 is a front perspective view of the present invention, illustrating the principal components thereof.
Figure 7:
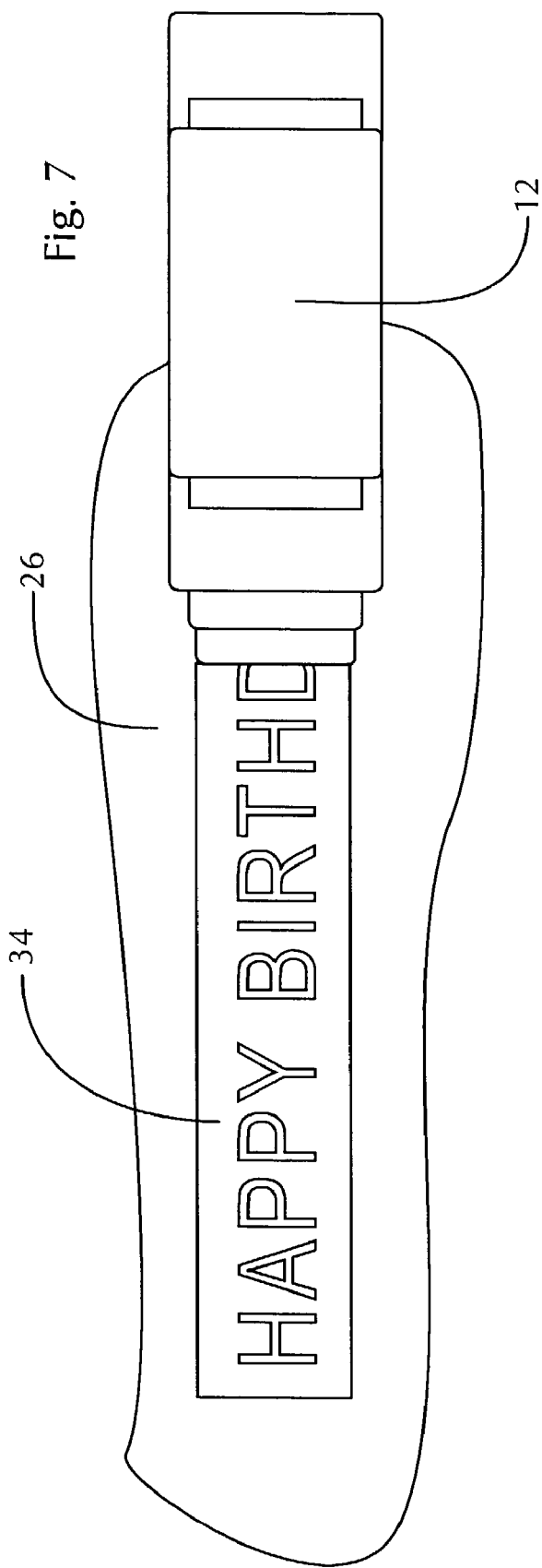
FIG. 7 is a top perspective view of the present invention, illustrating the result of the device as applied to the food in question, and illustrating a particular message impressed on the food for the purposes of example only.

An alternative location for the coloring device (20) is trailing behind the impressing wheel (18), as shown in FIG. 6. In this embodiment, the coloring substance is transferred directly onto the impressed material (26). The attachment of this alternative coloring device (20) is on the cover/handle (12) at the attachment location (16) for the impressing wheel (18).

Figure 5:
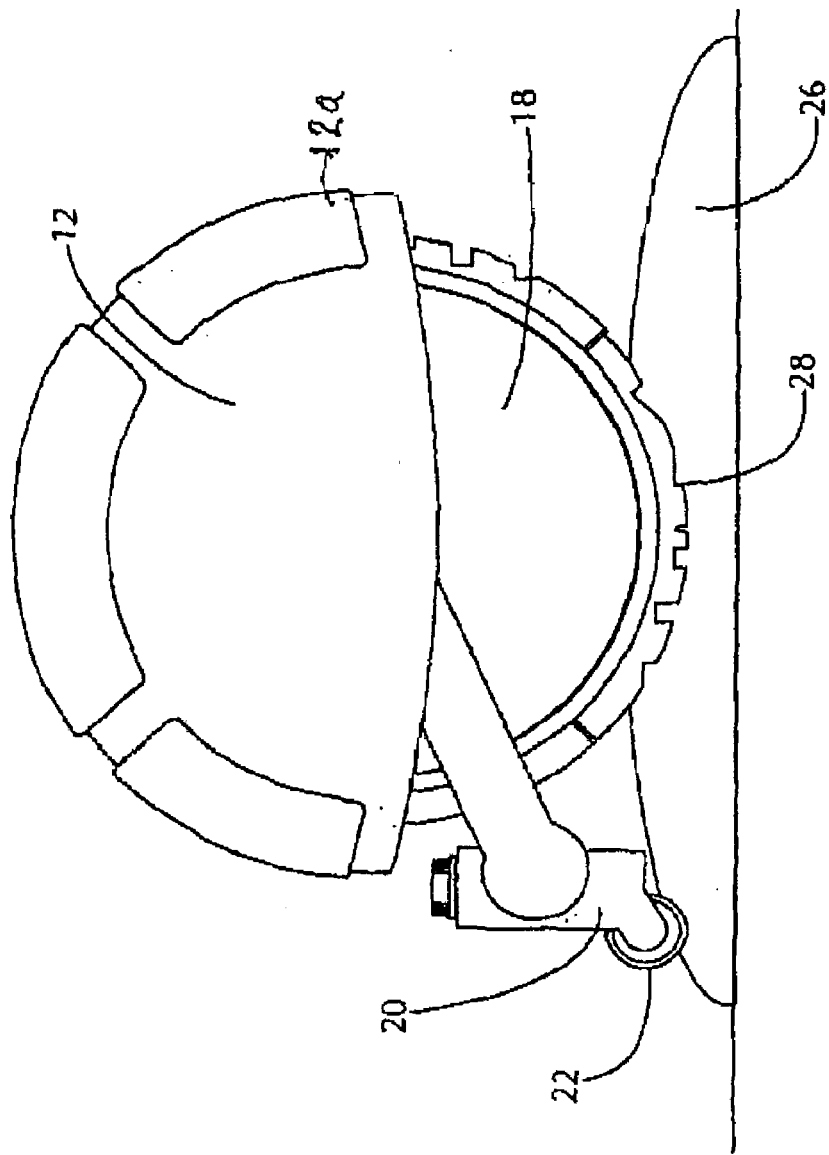
FIG. 5 is a side perspective view of the present invention, illustrating the principal components thereof, and illustrating the coloring means in operation.

The cover handle (12) also has, as also shown in FIG. 5, at an edge parallel to the rotational axis (30), a wide foot member (12a). The foot member (12a) functions to allow the entire roller device to be set down in a vertical position when not in use. This vertical position allows the user to easily pick up the impressing wheel and resume usage thereof.

The second assembly is the impressing wheel (18), which comprises an impressing pattern (28) oriented on the rolling surface of the wheel (18). The impressing pattern (28) may be applied to the wheel (18) by one of at least three methods: molded, rolling a linear pattern strip around the rolling surface, or snap-in modules.

Figure 4:
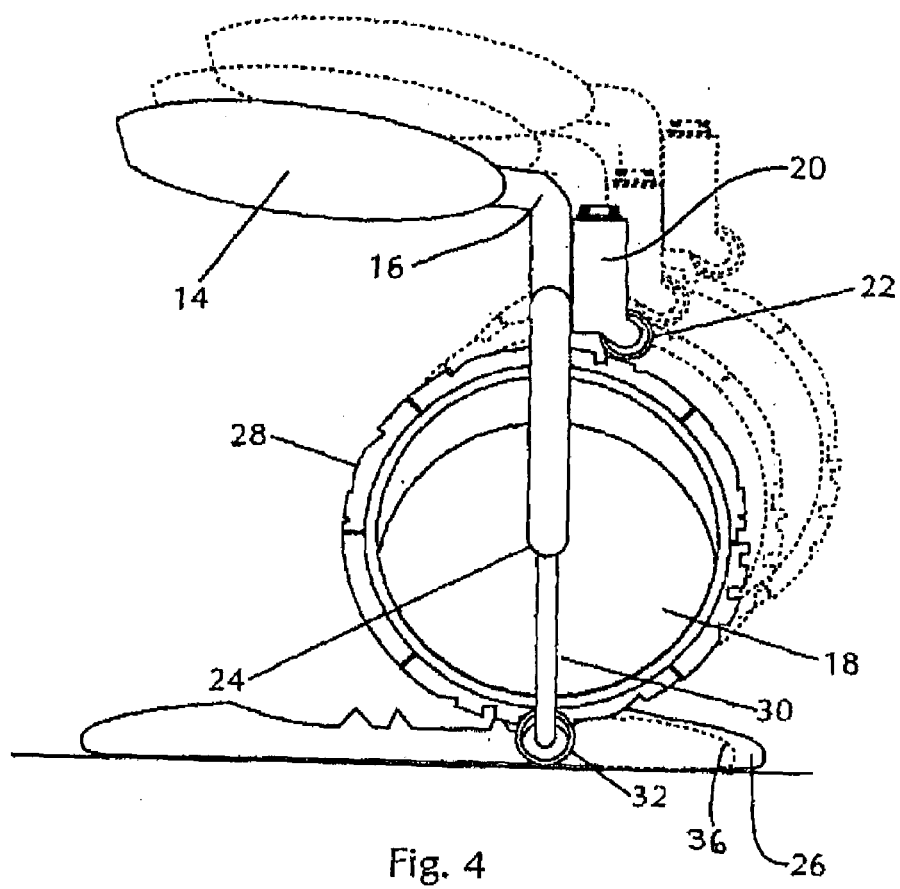
FIG. 4 is a side perspective view of the present invention, illustrating the principal components thereof, with the device in use upon the food in question, and illustrating the intended path of movement of same, and illustrating the cutting means in operation.
Figure 8:
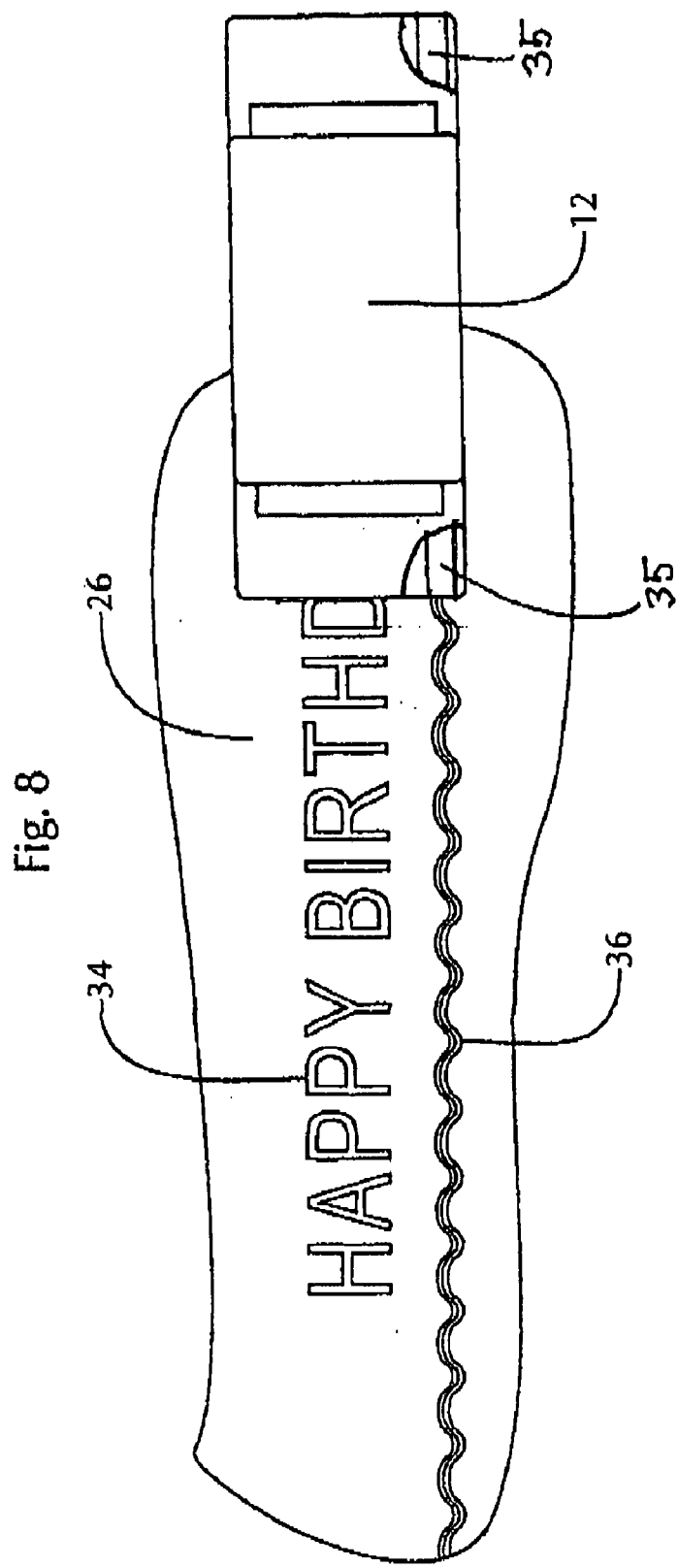
FIG. 8 is a top perspective view of the present invention, illustrating the result of the device as applied to the food in question, as well as the result of the cutting means cutting a serrated edge on the food, and illustrating a particular message impressed on the food for the purposes of example only.
Figure 9:
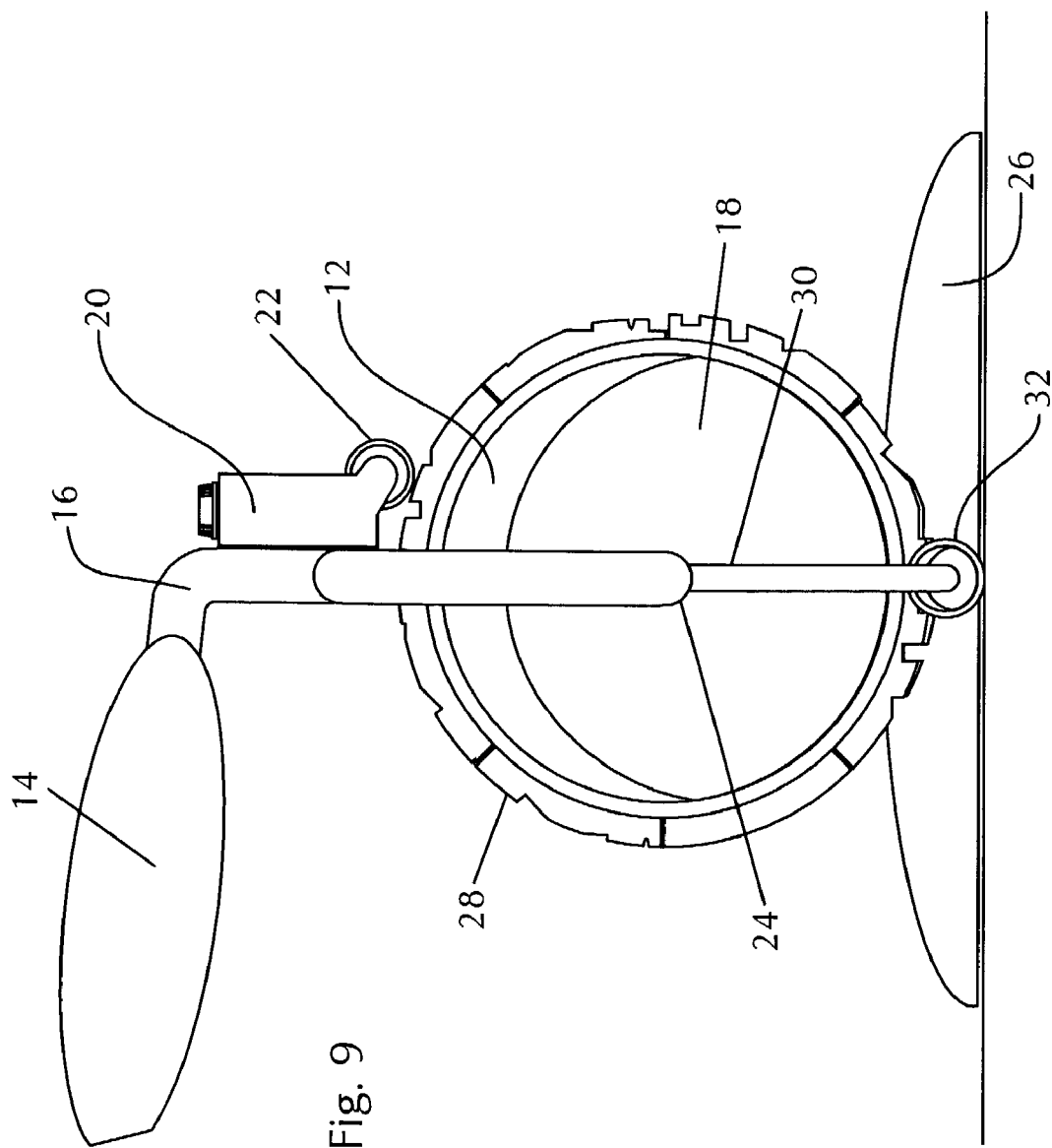
FIG. 9 is a side perspective view of the present invention, illustrating the principal components thereof, and illustrating the coloring means in detail.
Figure 10:
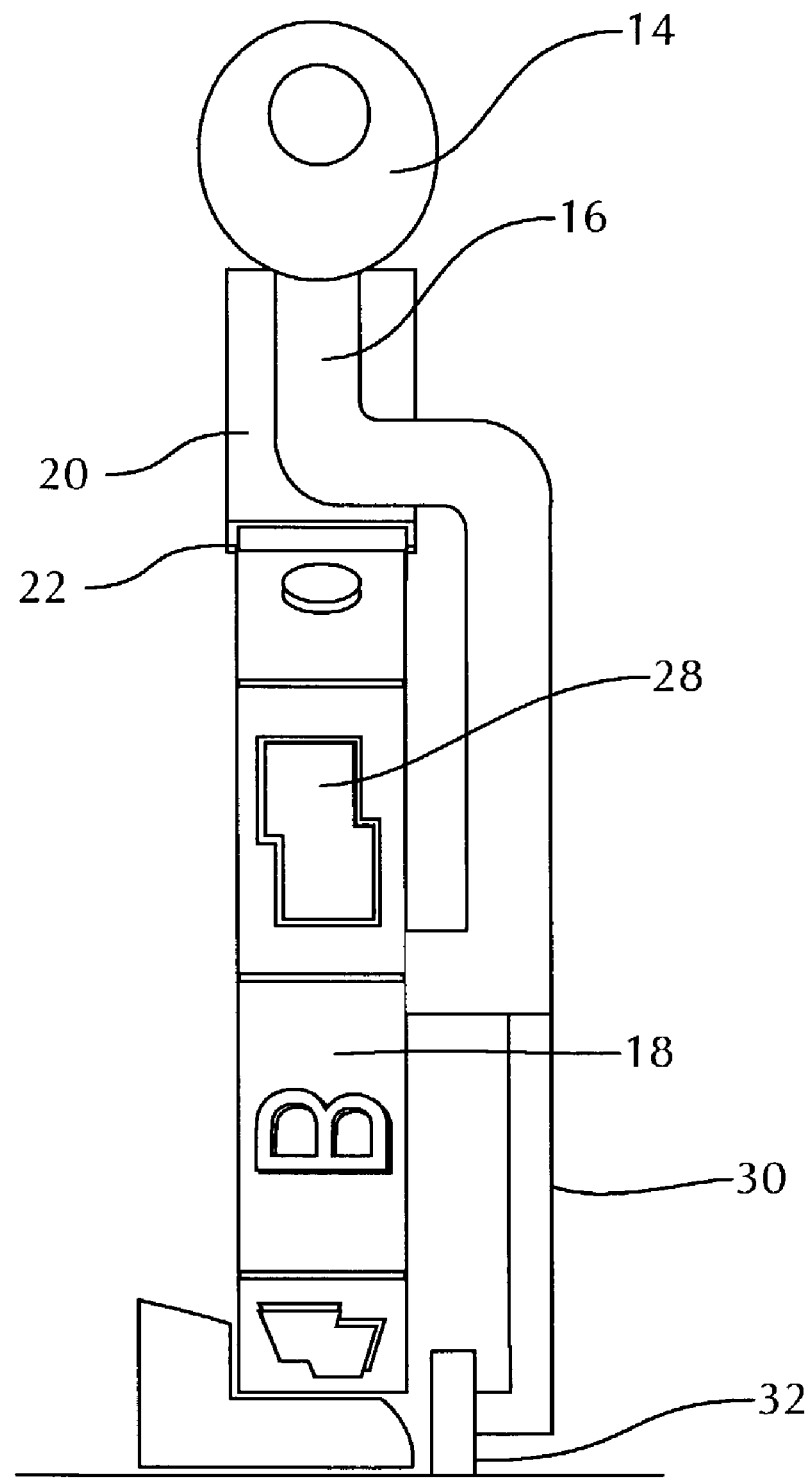
FIG. 10 is a top perspective view of the present invention, illustrating the result of the device as applied to the food in question, and illustrating particular shapes and characters impressed on the food for the purposes of example only.

The first of two attachments for the impressing wheel (18) is a cutting wheel (35) that allows the food in question (26) to be cut straight or cut with a pattern (36) while simultaneously being impressed, as best depicted in FIG. 4 and in partial cutaway in FIG. 8.

The second attachment for the impressing wheel (18) is a depth/guide wheel (32), which helps the user gauge how deep the impressing will be and the exact location of same. As shown in FIG. 11, adjustment of the depth of the impressing can be made to allow perfect impressions on a wide variety of foods with different impressing needs and thickness.

In addition, on an outer surface of the wheel (18), perpendicular to the impressing patterns (28), an orienting mark is placed. Importantly, such mark indicates the starting point of the impressing pattern (28) for user convenience.

In the preferred mode, the size of the roller is approximately six to nine inches in height, with width and length being varying depending upon the application in question.

As noted, the impressing pattern assembly can be changed for different patterns. As such, different impressing patterns may include snap-in letters, standard phrases or images (34), and custom phrases or images, allowing the impressing to be tailored to any occasion.

Regarding the intended method of utilizing the device, the user first has the roller with proposed impressing pattern installed. The user also has the desired effect of either simply impressing, or impressing combined with cutting, according to how the roller is configured. After the roller is configured to the liking of the user, the device is applied to the desired food for impressing.

Regarding manufacture of the device, the modular components of the embossing stamp may be injection molded, cast, molded, or machined from various materials. Such materials include, but are not limited to polymers, non-ferrous materials, and elastomers. In the preferred mode, the "fender" cover/handle is manufactured of high impact polymers for ease of production, durability, ergonomics, and cleaning.

Importantly, regarding practicality of use of the device, the roller is also produced to withstand considerable heat, such as from a dishwasher. The roller is also constructed to be highly durable in nature, particularly in light of its usage in commercial and industrial settings.

Moreover, adjustment of the depth of impressing can be made to allow perfect impressions on a wide variety of foods that have differing impressing needs and differing thickness. Such renders the roller versatile for a great variety of commercial, industrial, or residential applications.

In addition, the user may customize impressing patterns through usage of a snap-in feature. The possibilities include, but are not limited to, standard phrases and images, custom phrases and images, or a customizable kit.

Furthermore, the cutter may have wavy edges to provide an aesthetically-pleasing perimeter or edge of a variety of foods.

In a further enhanced embodiment of the roller, the user may apply color to the impressing on or in the food in question. This provides a further means to decorate and/or advertise upon a variety of foods, as desired by the user.

Finally, it is important to note that the roller device utilizes a minimal number of parts. Such provides both ease of assembly and disassembly, as well as ease of cleaning in commercial and residential dishwashers.

With regards to all descriptions and graphics, while the invention has been illustrated and described as embodied, it is not intended to be limited to the details shown, since it will be understood that various omissions, modifications, substitutions and changes in the forms and details of the device illustrated and in its operation can be made by those skilled in the art without departing in any way from the spirit of the invention.

Without further analysis, the foregoing will so fully reveal the gist of the present invention that others can readily adapt it for various applications without omitting features that, from the standpoint of prior art, constitute essential characteristics of the generic or specific aspects of this invention. What is claimed as new and desired to be protected by Letters Patent is set forth in the appended claims.

What is claimed is:

1. A roller device for impressing images onto a food product comprising:
    a cylindrical impressing wheel having an impressing pattern on an outer circumference thereof for impressing images on said food product;
    a cover/handle member enclosing a top portion of said impressing wheel attached to and supporting said impressing wheel for rotation at a center-rotating axis of said impressing wheel;
    said cover/handle member extending in a direction parallel to the direction of movement of said roller device; and
    means for limiting the depth of impressing images on said food product.

2. The roller device of claim 1 having a coloring device mounted on said cover/handle for delivering a coloring substance to the impressing pattern forward of said handle.

3. The roller device of claim 2 in which said means for limiting the depth of impressing images comprises a depth/guide wheel riding on a surface supporting said food product.

4. The roller device of claim 3 in which said impressing wheel has a width comparable to a width of a crusted edge of a pizza pie.

5. The roller device of claim 3 in which said impressing wheel has a width effective to impress a selected portion of said food product.

6. The roller device of claim 3 wherein the impressing pattern is interchangeable.

7. A food impressing device comprising:
    a handle having a grip centrally located over a hub of an impressing wheel, said handle forming a cover enclosing a top and portions of sides of said impressing wheel, said cover terminating above a bottom surface of said impressing wheel allowing said embossing wheel to change direction of movement, said handle extending in a direction parallel to the direction of movement of said food impressing device; and,
    a decorative impressing pattern layer being detachably layered over an outer contact surface of the impressing wheel.

8. A food impressing device of claim 7 wherein the decorative impressing layer is formed to depress a decorative pattern in a food substrate.

9. A food impressing device of claim 8, wherein the decorative impressing layer is a snap-on layer having words phrases or images.

10. A food impressing device of claim 9, wherein the decorative impressing layer is interchangeable.

11. A food impressing device of claim 10, wherein the decorative impressing layer forms images in the food substrate.

12. A food impressing device of claim 11, wherein the decorative impressing layer is formed of durable, waterproof, heat-resistant materials.

13. A food impressing device of claim 12, wherein an orienting marker is located on the impressing wheel.

14. A food impressing device comprising:
- an ergonomic handle rotatably attached at a proximal point through a central axis of a generally cylindrical impressing wheel, said handle enclosing a top portion of said impressing wheel, said handle extending in a direction parallel to the direction of movement of said food impressing device;
- a snap-on, detachable decorative impressing pattern layer of durable, waterproof resistant materials on an outer contact surface of the impressing wheel for depressing a decorative pattern in a food substrate, said pattern including words, phrases or images; and
- a coloring device is removably attached to the handle.

15. A food impressing device of claim 14, wherein a color distributing roller is mountable attached to the coloring device.

16. A food impressing device of claim 15, wherein a foot member is removably attached to the proximal point of the handle near the central axis of the impressing wheel.

17. A food impressing device of claim 16, wherein a depth guide is rotatably mounted on the foot member.

\* \* \* \* \*